US008036630B2

(12) United States Patent
Park et al.

(10) Patent No.: US 8,036,630 B2
(45) Date of Patent: Oct. 11, 2011

(54) METHOD AND APPARATUS FOR MAKING AN EMERGENCY CALL USING A MOBILE COMMUNICATION TERMINAL

(75) Inventors: Jung-Hun Park, Yongin-si (KR); Dae-Hyun Sim, Seoul (KR); Hyun-Soo Kim, Suwon-si (KR); Kyung-Tack Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 628 days.

(21) Appl. No.: 11/717,500

(22) Filed: Mar. 13, 2007

(65) Prior Publication Data

US 2007/0218923 A1   Sep. 20, 2007

(30) Foreign Application Priority Data

Mar. 14, 2006   (KR) .................. 10-2006-0023609

(51) Int. Cl.
*H04M 11/04* (2006.01)

(52) U.S. Cl. .................. 455/404.1; 455/404.2

(58) Field of Classification Search ............. 455/404.1, 455/456.1, 404.2; 704/235
See application file for complete search history.

(56) References Cited

U.S. PATENT DOCUMENTS

| 6,014,555 | A  | * | 1/2000 | Tendler ............. 455/404.1 |
| 6,690,932 | B1 | * | 2/2004 | Barnier et al. ...... 455/414.1 |
| 6,766,159 | B2 | * | 7/2004 | Lindholm .......... 455/404.1 |
| 6,820,055 | B2 | * | 11/2004 | Saindon et al. ..... 704/235 |
| 7,412,260 | B2 | * | 8/2008 | Gailey et al. ...... 455/563 |
| 7,480,501 | B2 | * | 1/2009 | Petite ............. 455/404.1 |
| 2004/0105529 | A1 | * | 6/2004 | Salvucci et al. ..... 379/45 |
| 2004/0176123 | A1 | * | 9/2004 | Chin et al. ........ 455/521 |
| 2005/0239477 | A1 | * | 10/2005 | Kim et al. ......... 455/456.1 |
| 2006/0030290 | A1 | * | 2/2006 | Rudolf et al. ...... 455/404.1 |
| 2006/0128356 | A1 | * | 6/2006 | Yamazaki et al. .... 455/404.1 |
| 2006/0172720 | A1 | * | 8/2006 | Islam et al. ....... 455/404.1 |
| 2006/0286961 | A1 | * | 12/2006 | Levitan ........... 455/404.2 |
| 2007/0135088 | A1 | * | 6/2007 | Alessandro ........ 455/404.1 |
| 2007/0142026 | A1 | * | 6/2007 | Kuz et al. ......... 455/404.1 |
| 2007/0142028 | A1 | * | 6/2007 | Ayoub et al. ...... 455/404.1 |

FOREIGN PATENT DOCUMENTS

KR   1020020094333   12/2002

* cited by examiner

*Primary Examiner* — Nick Corsaro
*Assistant Examiner* — Sowmini Nair
(74) *Attorney, Agent, or Firm* — The Farrell Law Firm, P.C.

(57) ABSTRACT

Disclosed is a method for making an emergency call by using a mobile communication terminal. The method includes identifying a current position when a user makes an emergency call request; retrieving an emergency call number from emergency call numbers pre-stored for respective regions, the emergency call number being used in a region corresponding to the current position; and dialing the emergency call number.

10 Claims, 4 Drawing Sheets

METHOD AND APPARATUS FOR MAKING AN EMERGENCY CALL USING A MOBILE COMMUNICATION TERMINAL

PRIORITY

This application claims priority under 35 USC§119 to an application entitled "Method and Apparatus for Making Emergency Call by Using Mobile Communication Terminal" filed with the Korean Intellectual Property Office on Mar. 14, 2006 and assigned Serial No. 2006-23609, the contents of which are incorporated herein by reference.

BACKGROUND OF THE INVENTION

1. Field of the Invention

The present invention relates generally to a mobile communication terminal, and in particular, to a method and an apparatus for making an emergency call in an urgent situation by using a mobile communication terminal.

2. Description of the Related Art

In general, when a user of a mobile communication terminal incorporating an emergency calling function confronts an urgent situation, the user can make an emergency call by operating a predetermined key so that a predetermined telephone number (e.g., telephone number of the national rescue center or other rescue corps) is automatically dialed or a pre-stored text message is transmitted to that number.

When the telephone number of the national rescue center has been pre-stored in the mobile communication terminal, however, the emergency calling function fails outside of that nation, because each nation has its own emergency call number. This means that, when the user operates the emergency key while staying in another nation, an emergency call cannot be made to that nation's rescue center. Furthermore, the user may not be aware of that nation's emergency call number. In this case, the user cannot easily contact the rescue center even by dialing numbers, to say nothing of using the emergency call function.

Even when the user has contacted the rescue center somehow, the user would have difficulty in describing the urgent situation due to the language barrier.

SUMMARY OF THE INVENTION

Accordingly, the present invention has been made to solve the above-mentioned problems occurring in the prior art, and an object of the present invention is to provide a method and an apparatus for making an emergency call by using a mobile communication terminal regardless of the current position.

Another object of the present invention is to provide a method and an apparatus for enabling a user to request an emergency rescue by making an easy emergency call at any location.

In order to accomplish this object, there is provided a method for making an emergency call by using a mobile communication terminal, the method including identifying a current position when a user makes an emergency call request; retrieving an emergency call number from emergency call numbers pre-stored for respective regions, the emergency call number being used in a region corresponding to the current position; and dialing the emergency call number.

In accordance with another aspect of the present invention, there is provided an apparatus for making an emergency call by using a mobile communication terminal, the apparatus including a memory unit for storing a number of emergency call numbers used in respective regions and a control unit for identifying a current position when a user makes an emergency call request, the control unit retrieving an emergency call number from the emergency call numbers, the emergency call number being used in a region corresponding to the current position, and dialing the emergency call number.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
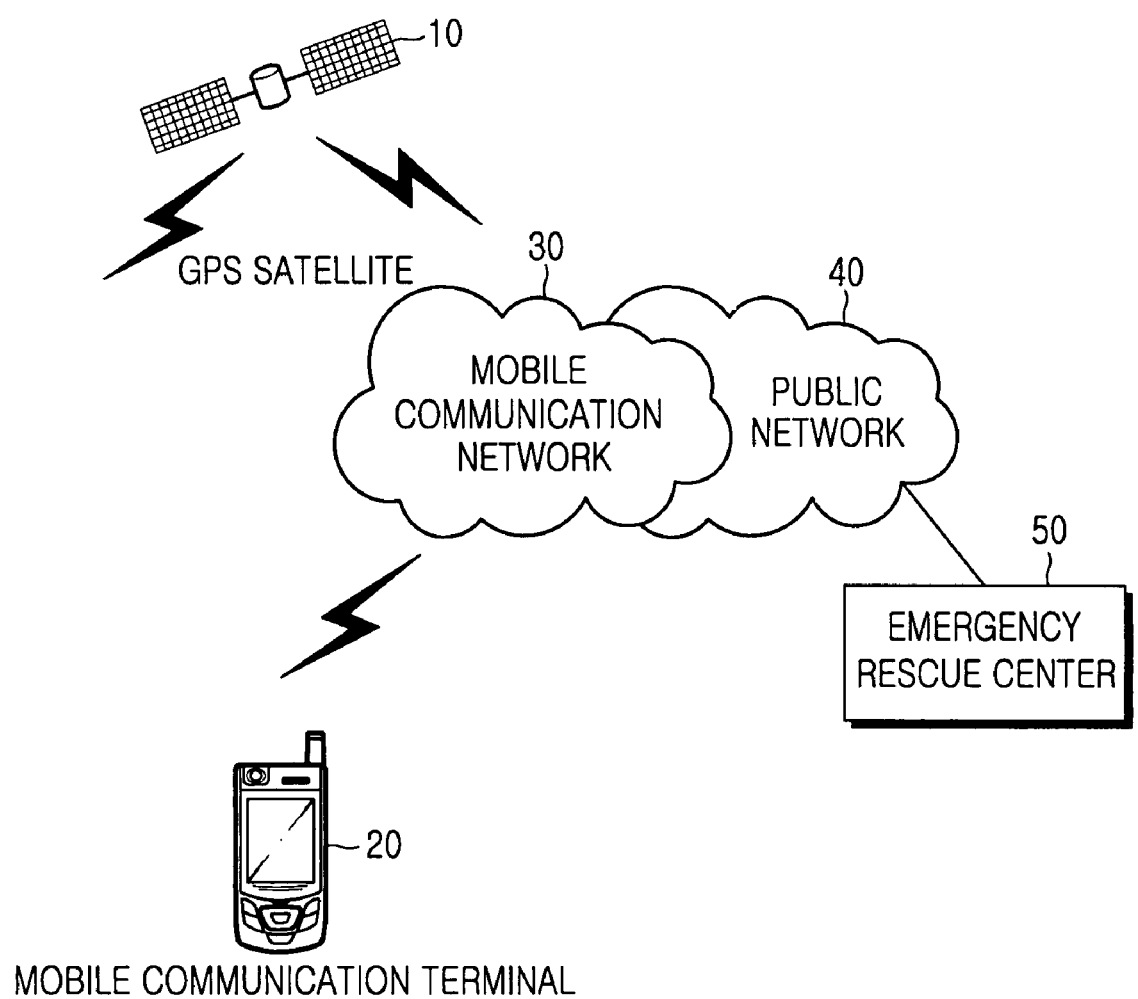
FIG. 1 shows a construction of a communication system based on the present invention.

A communication system based on the present invention will now be described with reference to FIG. 1, which shows its construction. Referring to FIG. 1, the communication system includes a Global Positioning System (GPS) satellite 10, a mobile communication terminal 20, a mobile communication network 30, a public network 40, and an emergency rescue center 50.

The GPS satellite 10 periodically broadcasts GPS signals. The mobile communication network 30 provides the mobile communication terminal 20 with various mobile communication services. The mobile communication network 30 interworks with a navigation server (not shown) so as to provide a navigation service. The mobile communication network 30 interworks with the public network 40 so as to provide the mobile communication network 20 with a communication service via the public network 40. The emergency rescue center 50 is connected to the public network 40 and, in response to an emergency call from a terminal, deals with the emergency situation. The mobile communication terminal 20 interworks with the mobile communication network 30 so as to perform mobile communication and receives GPS signals from the GPS satellite 10.

When a user requests an emergency call, the mobile communication terminal positions the user based on GPS signals received from the GPS satellite 10. The mobile communication terminal 20 then retrieves the emergency call number (e.g., telephone number of the emergency rescue center 50) corresponding to the user's current position from pre-stored emergency call numbers in various positions and dials that number. When the call is connected to the emergency rescue center 50, the mobile communication terminal 20 transmits a pre-stored emergency message (e.g., voice message) thereto.

According to a second embodiment of the present invention, the mobile communication terminal 20 requests the mobile communication network 30 to position the user at the user' request for an emergency call. After receiving information regarding the user's current position from the mobile communication network 30, the mobile communication terminal 20 retrieves the emergency call number (e.g., telephone number of the emergency rescue center 50) corresponding to the user's current position from pre-stored emergency call numbers in various positions and dials that number. When the call is connected to the emergency rescue center 50, the mobile communication terminal 20 transmits a pre-stored emergency message (e.g. voice message) thereto.

Figure 2:
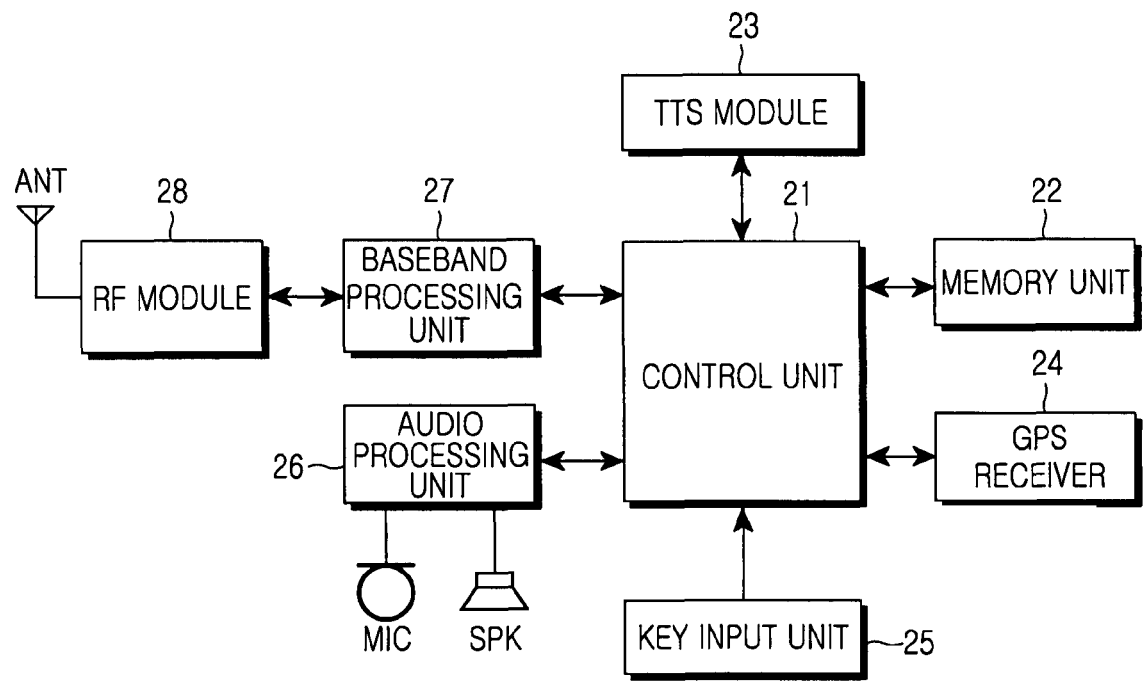
FIG. 2 is a block diagram illustrating a construction of a mobile communication terminal according to a first embodiment of the present invention.

FIG. 2 is block diagram illustrating a construction of the mobile communication terminal 20 according to the present invention. Referring to FIG. 2, the mobile communication terminal 20 includes a control unit 21, a memory unit 22, a Text To Speech (TTS) module 23, a GPS receiver 24, a key input unit 25, an audio processing unit 26, a baseband processing unit 27, and an RF (Radio Frequency) module 28.

The control unit 21 controls the overall operation of the mobile communication terminal.

The key input unit 25 has character keys, to which the Roman alphabet or the Korean alphabet and numerals 0-9 are allocated, special symbol keys (e.g., * and # keys), and function keys for various functions of the mobile communication terminal, including menu, selection, speech, deletion, power on/off, volume, and photography. When the user operates the keys, the key input unit 25 transmits corresponding key input data to the control unit 21. According to the present invention, the key input unit 25 has an emergency call key. When the user operates the emergency call key, the key input unit 25 outputs key input data, which informs that the user has requested an emergency call, to the control unit 21.

The RF module 28 transmits/receives radio signals to/from a mobile communication base station via an antenna. Particularly, the RF module 28 modulates signals to be transmitted, which are inputted from the control unit 21 via the baseband processing unit 27, and transmits them via the antenna. The RF module 28 demodulates RF signals, which are received via the antenna, and transmits them to the control unit 21 via the baseband processing unit 27. The baseband processing unit 27 processes baseband signals transmitted/received between the RF module 28 and the control unit 21.

The audio processing unit 26 is connected to the control unit 21 and performs audio communication and voice recording together with a microphone MIC and a speaker SPK connected to the audio processing unit 26.

The memory unit 22 acts as a working memory of the control unit 21 and stores programs necessary for processing and control of the control unit 21, reference data, and updateable storage data. According to the present invention, the memory unit 22 stores regional information corresponding to positional coordinates included in GSP reception signals, as well as emergency call numbers for respective regions or nations. The emergency call numbers can include telephone numbers of emergency rescue centers 50 (e.g., 119 and 911) and specific telephone numbers designated by the user. In addition, the memory unit 22 according tithe present invention stores text-type emergency messages for requesting help or describing the situation, which have been prepared in regional languages. The messages can be determined by the manufacturer or composed by the user.

The TTS module 23 converts text data into audio data. Particularly, the TTS module 23 converts an inputted emergency message into an emergency voice message and outputs it under the control of the control unit 21. In addition, the TTS module 23 converts positional coordinates into audio data and outputs it.

The GPS receiver 24 receives GPS signals, which are broadcasted by the GPS satellite 10, and outputs them to the control unit 21.

Figure 3:
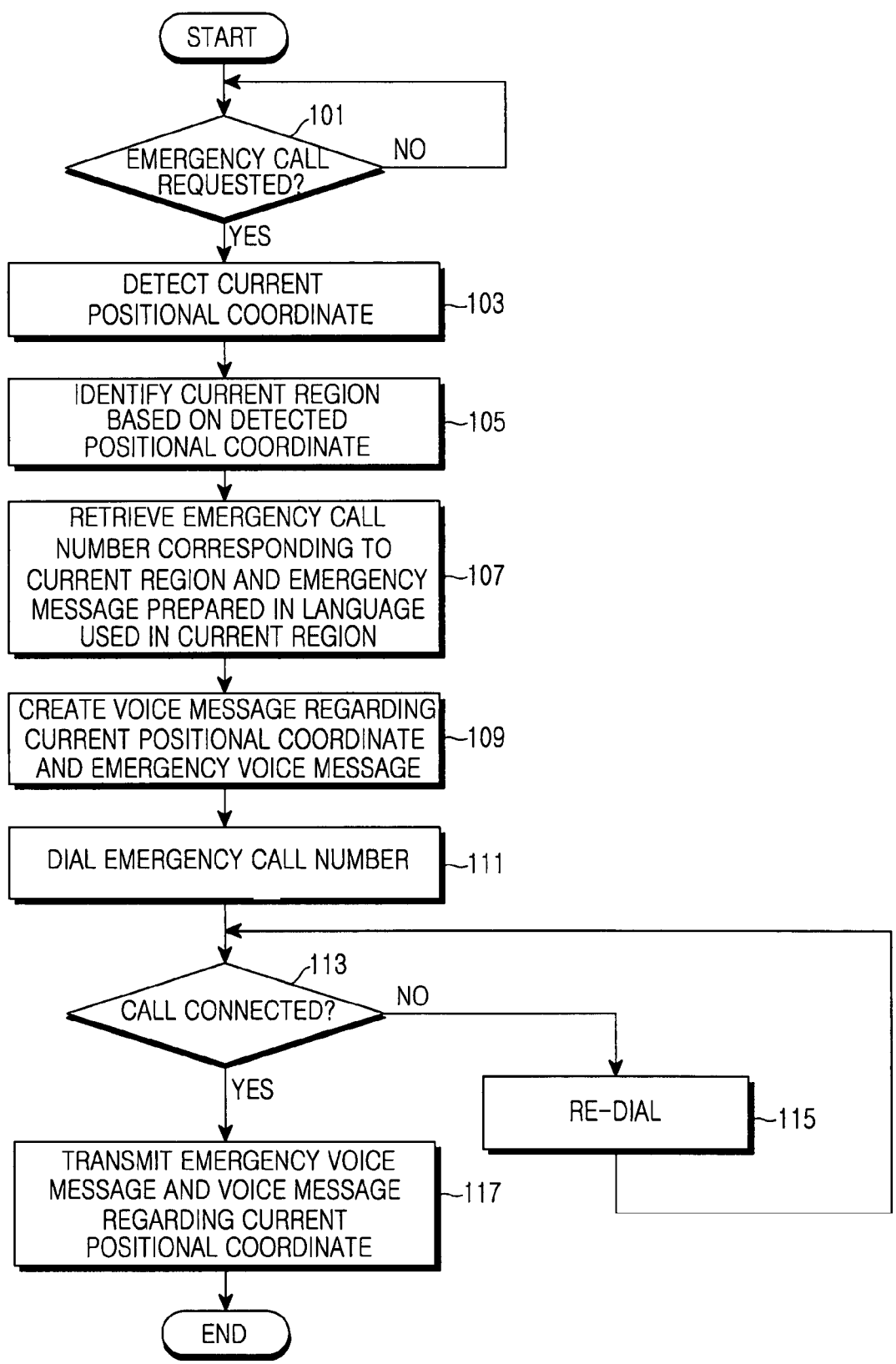
FIG. 3 is a flow chart illustrating operation steps of a mobile communication terminal according to a first embodiment of the present invention.

FIG. 3 is a flow chart illustrating operation steps of the mobile communication terminal 20 according to the first embodiment of the present invention, which is constructed as mentioned above. Referring to FIG. 3, the control unit 21 monitors an emergency call request from the user in step 101. When the user makes an emergency call request by operating the emergency call key or selecting a menu, for example, the control unit 21 proceeds to step 103. The control unit 21 detects the current positional coordinate based on GPS signals received by the GPS receiver 24 at the user's emergency call request in step 103 and proceeds to step 105. The control unit 21 identifies the region in which the user is currently positioned based on the detected positional coordinate in step 105 and proceeds to step 107. The control unit 21 retrieves an emergency call number corresponding to the identified region and an emergency message prepared in the regional language in step 107 and proceeds to step 109. For example, when the user is currently positioned in Seoul, the corresponding emergency call number 119 is retrieved together with an emergency message prepared in Korean. The control unit 21 outputs the retrieved emergency message and the current positional coordinate to the TTS module 23 in step 109 so that a voice message containing the current positional coordinate and an emergency voice message are created. The control unit 21 proceeds to step 111, in which it dials the emergency call number retrieved in step 107, and proceeds to step 113. The control unit 21 confirms if a call has been connected in step 113 and, if so, proceeds to step 117. The control unit 21 transmits the emergency voice message and the voice message containing the current positional coordinate in step 117 and ends the operation. If it is confirmed in step 113 that no call has been connected, the control unit proceeds to step 115 and repeats dialing until a call is connected.

Figure 4:
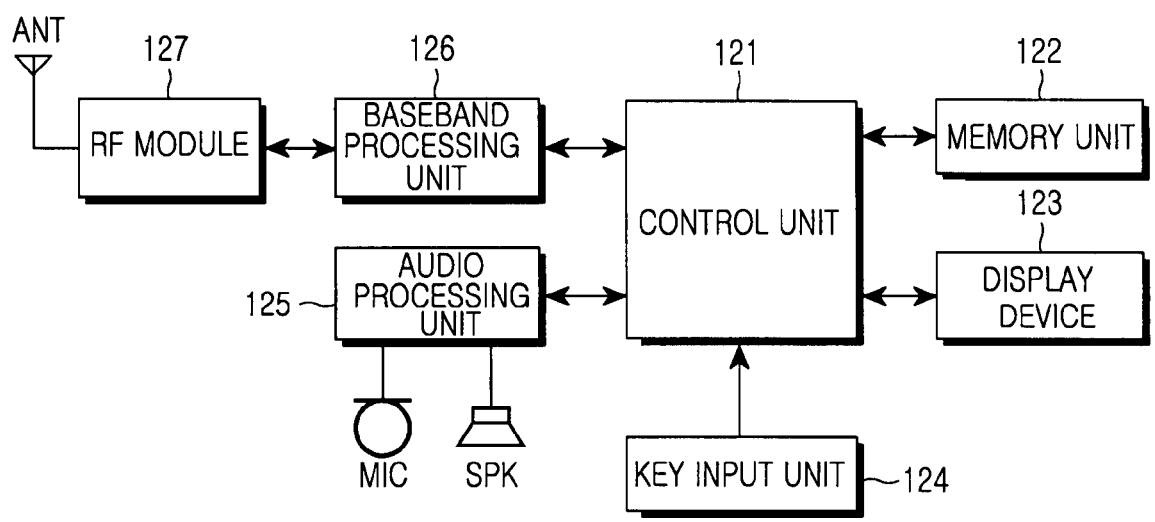
FIG. 4 is a block diagram illustrating a construction of a mobile communication terminal according to a second embodiment of the present invention.

FIG. 4 is a block diagram illustrating a construction of a mobile communication terminal 20 according to a second embodiment of the present invention. Referring to FIG. 4, the mobile communication terminal 20 includes a control unit 121, a memory unit 122, a display device 123, a key input unit 124, an audio processing unit 125, a baseband processing unit 126, and an RF module 127.

The control unit 121 controls the overall operation of the mobile communication terminal.

The key input unit 124, the audio processing unit 125, the baseband processing unit 126, and the RF module 127 have similar construction and operation as those of the key input unit 25, the audio processing unit 26, the baseband processing unit 27, and the RF module 28, have been described with reference to FIG. 2.

The memory unit 122 acts as a working memory of the control unit 121 and stores programs necessary for processing and control of the control unit 121, reference data, and updateable storage data. According to the present invention, the memory unit 122 stores emergency call numbers for respective regions or nations. The emergency call numbers can include telephone numbers of emergency rescue centers 50 (e.g., 119 and 911) and specific telephone numbers designated by the user. In addition, the memory unit 122 according to the present invention stores emergency voice messages for requesting help or describing the situation, which have been prepared in regional languages. The messages may be determined by the manufacturer or composed by the user.

When the user makes an emergency call request by operating the emergency call key, for example, the mobile communication terminal 20 according to the second embodiment of the present invention, which is constructed as mentioned above, requests the mobile communication network 30 to provide information regarding the current position of the mobile communication terminal 20. Upon receiving information regarding the current position from the mobile communication network 30, the mobile communication terminal 20 retrieves an emergency call number corresponding to the current region and an emergency voice message prepared in the regional language. For example, when the user is currently positioned in New York, the corresponding emergency call number 911 is retrieved together with an emergency voice message prepared in English. The control unit 121 dials the retrieved emergency call number and, when a call is connected to the emergency rescue center 50, transmits the emergency voice message. The control unit 121 can transmit the information regarding the current position, which has been received from the mobile communication network 30, to the emergency rescue center 50 as a text message.

As mentioned above, the present invention is advantageous in that, when a user makes an emergency call request, his mobile communication terminal 20 retrieves an emergency call number corresponding to the user's current position and dials that number so that, after a call is connected to the receiving side, an emergency voice message is transmitted. As such, the user can request help in an urgent situation regardless of the current position.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for making an emergency call by using a mobile communication terminal, the method comprising the steps of:
    identifying a current position of the mobile communication terminal when a user makes an emergency call request;
    retrieving an emergency call number from emergency call numbers pre-stored for respective regions, the emergency call number being used in a region corresponding to the current position; and
    dialing the emergency call number;
    automatically determining an emergency voice message corresponding to the current position of the mobile communication terminal from emergency voice messages pre-stored in the mobile terminal in different languages for respective regions, the emergency voice message being prepared in a language used in the region corresponding to the current position of the mobile communication terminal;
    transmitting the emergency voice message to a receiving party when a call is connected to the receiving party;
    converting the current position into a voice message; and
    transmitting the voice message to the receiving, party when a call is connected to the receiving party.

2. The method as claimed in claim 1, wherein, in identifying a current position, a positional coordinate is detected from a received GPS signal.

3. The method as claimed in claim 2, wherein, in identifying a current position, a request for information regarding the current position is transmitted to a mobile communication network, and the information is received from the mobile communication network.

4. The method as claimed in claim 3, further comprising transmitting a text message regarding the current position when a call is connected to the receiving party.

5. An apparatus for making an emergency call by using a mobile communication terminal, the apparatus comprising:
    a memory unit for storing a plurality of emergency call numbers used in respective regions; and a control unit for identifying a current position of the mobile communication terminal when a user makes an emergency call request, the control unit retrieving an emergency call number from the emergency call numbers, the emergency call number being used in a region corresponding to the current position, dialing the emergency call number, automatically determining an emergency voice message from the plurality of voice messages pre-stored in different languages for respective regions corresponding to the current position of the mobile communication terminal, the emergency voice message being prepared in a language used in the region corresponding to the current position of the mobile communication terminal, transmitting the emergency voice message to a receiving party when the emergency call is connected to the receiving party, converting the current position into a voice message, and transmitting the voice message to the receiving party when a call is connected to the receiving party.

6. The apparatus as claimed in claim 5, wherein the memory unit is adapted to store emergency text messages prepared in languages used in respective regions, and the control unit is adapted to retrieve an emergency text message prepared in a language used in a region corresponding to the current position, and convert the emergency text message into the emergency voice message.

7. The apparatus as claimed in claim 5, wherein the control unit is adapted to detect a positional coordinate from a received GPS signal so as to identify the current position.

8. The apparatus as claimed in claim 7, wherein the control unit is adapted to transmit a request for information regarding the current position to a mobile communication network and receive the information from the mobile communication network so as to identify the current position.

9. The apparatus as claimed in claim 8, wherein the control unit is adapted to transmit a text message regarding the current position when a call is connected to the receiving party.

10. The apparatus as claimed in claim 5, wherein the memory unit is adapted to store emergency voice messages prepared in languages used in respective regions and retrieve an emergency voice message prepared in a language used in a region corresponding to the current position, the emergency voice message being transmitted to a receiving party when a call is connected to the receiving party.

* * * * *